Figure 5:
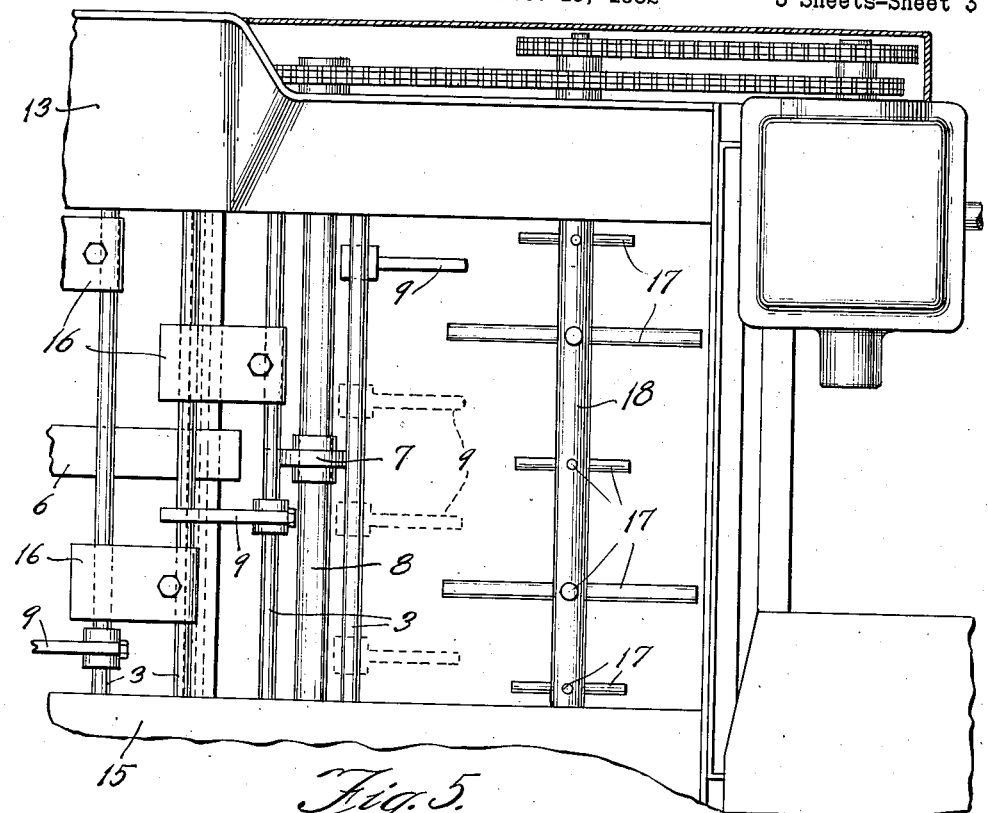

Sept. 3, 1935. W. E. PHILIPS ET AL 2,013,502
MATERIAL HANDLING AND PREPARATION UNIT
Filed Dec. 19, 1932 3 Sheets-Sheet 1
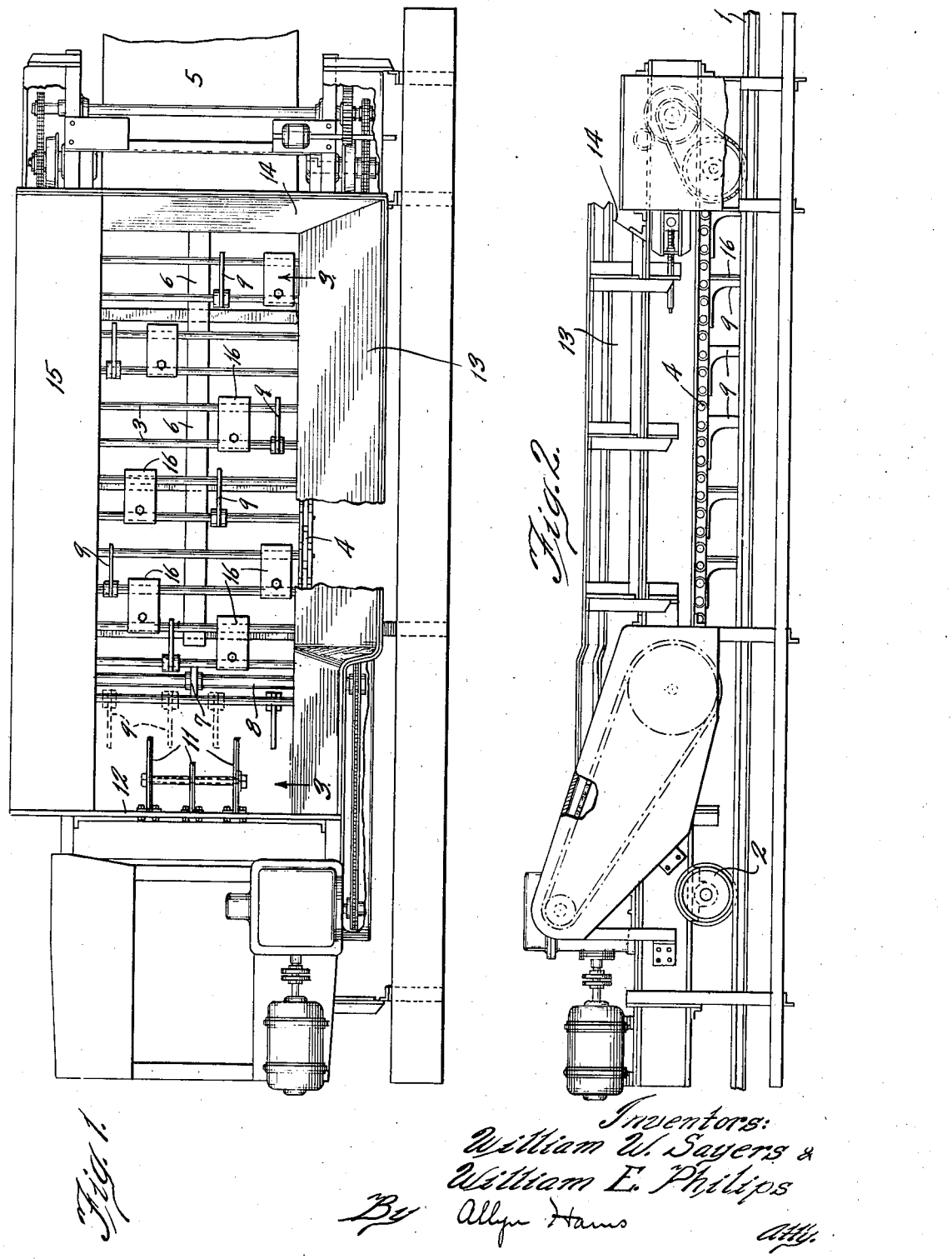

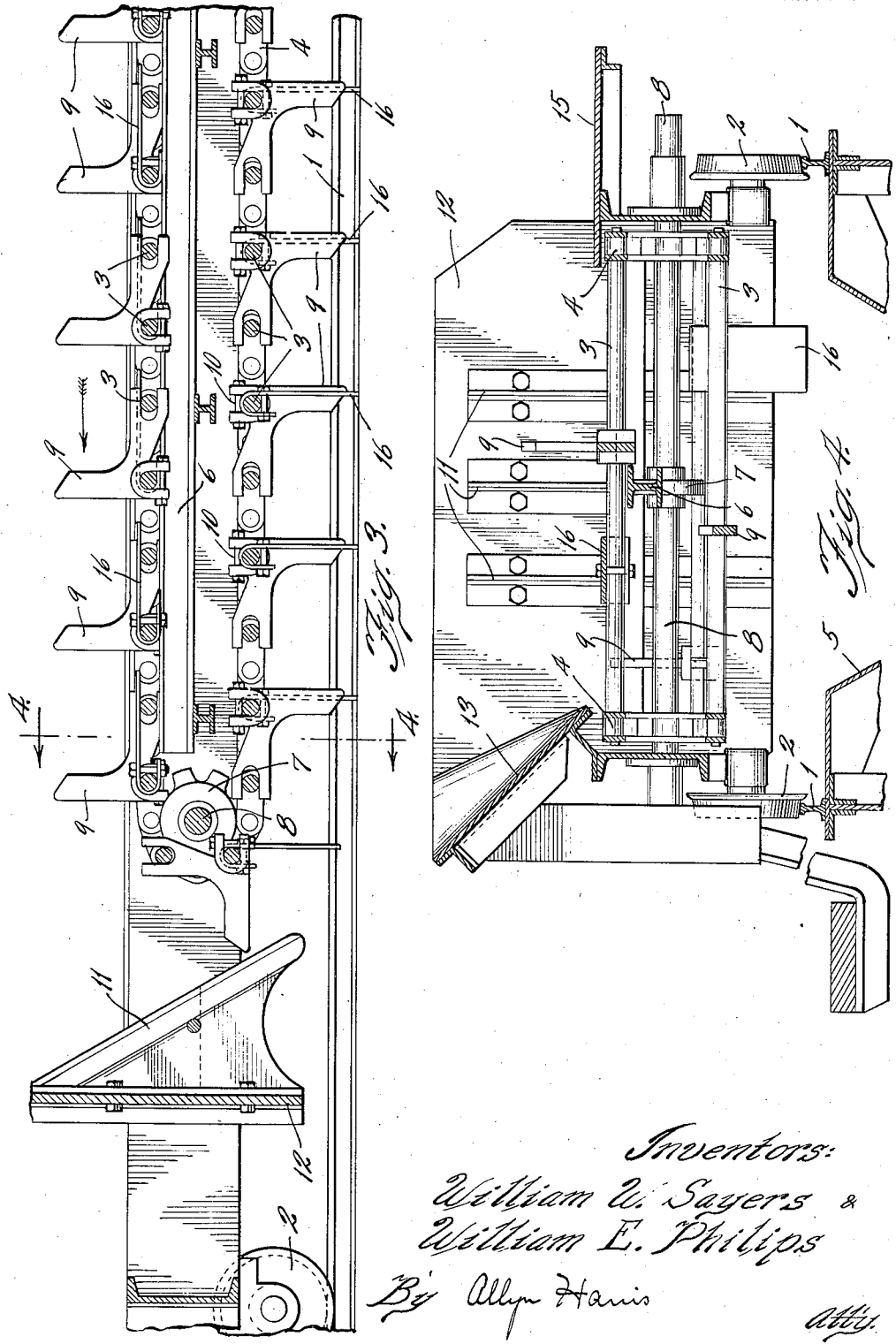

Patented Sept. 3, 1935

2,013,502

UNITED STATES PATENT OFFICE 2,013,502

MATERIAL HANDLING AND PREPARATION UNIT

William E. Philips and William W. Sayers, Chicago, Ill., assignors to Link-Belt Company, a corporation of Illinois Application December 19, 1932, Serial No. 647,926

25 Claims. (Cl. 209—6)

There are many classes of work which involve the transportation of large volumes of material to point of destination from a source located sufficiently far from the point of destination to require the use of an organized system of material handling equipment. In levee building work, for example, material is usually excavated from a borrow pit covering a considerable area adjacent to the building levee and this material is then deposited by the excavating units onto the apparatus designed to transport it to the levee site. Another example of this situation is found in connection with brick and similar manufacturing plants where material is excavated in relatively large volumes and then transported through some organized system of carrying equipment to the ultimate point of use. There are many manufacturing and industrial processes which involve substantially the conditions indicated by these two examples.

Excavating equipment by its very nature involves the excavating or picking up of large quantities of material in successive stages and in the normal course of events in manufacturing or industrial processes, as suggested above, these large quantities are deposited by excavating units directly onto the individual transporting units of whatever character they might be. This, however, is impracticable or undesirable in a great many situations. Again using the levee building process as an illustration, it is highly desirable that material be delivered to the levee in relatively small quantities at any given instant, but in a continuous manner. It is also most desirable that the material going into the levee be uniformly sized and free from large lumps which might result in a structure having numerous voids and which consequently would not well perform its intended purpose. Another important consideration where levee building is concerned is that the material going into the levee must be free of foreign matter, particularly organic substances. Thus, in this situation, as in a great many others, it is desirable to transport the material by means of a system of belt conveyors and to provide for the proper sizing of the material before it is placed on the conveyors and for uniform distribution of the material upon the conveyors whereby it passes in suitably prepared form and in a continuous stream along the conveyor system and whereby an opportunity is afforded for the removal of foreign matter during the transportation of the material toward the levee site. Similar considerations are presented in relation to the securing and transporting of material for brick and other manufacturing plants. It is apparent, however, that excavating units are not in themselves well adapted to meet these conditions inasmuch as they are designed essentially for the picking up and depositing of large volumes of material in an intermittent fashion and for the further reason that they discharge the material onto the conveying mechanism, whatever it might be, in precisely the same condition as picked up by the excavator.

In view of the above comments, it should be apparent that in many situations such as those indicated by way of example, there is distinct need for an intermediate unit or units to be functionally interposed between the excavating unit and the transporting unit. Particularly where belt conveyors are used as the transporting medium, the functions of such an intermediate unit should be to receive material from the excavating units, and after proper conditioning of such material into a limited range of sizes, to deliver it at a reasonably uniform rate to the belt conveyors. This conditioning, of course, should involve reduction of large lumps to a size suitable for the work at hand and this, together with the reasonably uniform distribution of material on the belt conveyors, would afford the desired opportunity for the picking out of foreign matter as the material progresses along the belt conveyor system. Such an intermediate unit should also be capable of handling different classes of material as they may be encountered from time to time during the progress of a single piece of work. In other words, referring again to the levee building process, the excavators may at one stage encounter lumpy or gummy material or at another time they may have to deal entirely with a free flowing sandy material.

The object of the present invention is to provide an intermediate unit, designed for these purposes. For convenience, this unit will be hereinafter referred to as a feeder, although from what has been said, it will be appreciated that this unit has many important functions in addition to that of uniformly feeding material onto a transporting unit.

More particularly, it is an object of the invention to provide an intermediate or feeder unit capable of receiving and conditioning material in a variety of initial conditions and of delivering same at a desired and reasonably uniform rate onto a transporting unit or a system of such units.

Figure 6:
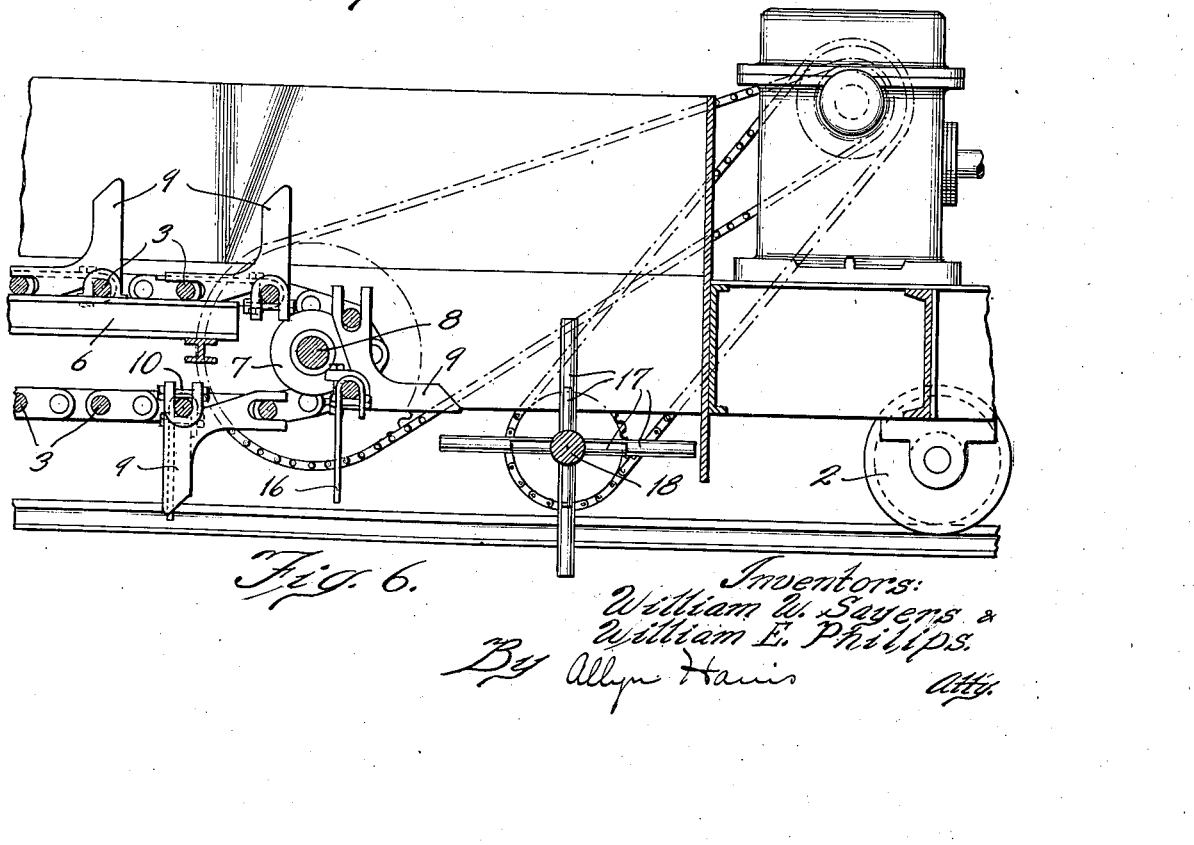

Referring to the drawings,

Figure 1 is a top plan view of a feeder embodying the principles of this invention, Figure 2 is a side elevation of same with parts broken away, Figure 3 is a longitudinal section taken on the line 3—3 of Figure 1, Figure 4 is a transverse section taken on the line 4—4 of Figure 3, Figure 5 is a fragmentary top plan view illustrating a slightly modified form of the invention, Figure 6 is a view in side elevation of the construction shown in Figure 5.

In the particular form shown, the improved feeder is designed to be mounted directly on top of a belt conveyor unit. Thus, the rails 1 shown in Figures 2, 3 and 4 are carried by the belt conveyor unit and in turn support the feeder unit by means of car wheels 2, thus permitting the feeder to be moved lengthwise of the conveyor unit to accommodate changing positions of the adjacent excavating unit or units. It is to be understood, however, that the feeder need not necessarily be mounted directly on the conveyor units, but that it might equally well be provided with a fixed mounting and positioned on the ground or other surface adjacent the belt conveyor unit, or alternatively, it might be provided with travelling treads enabling it to be moved from time to time, perhaps under its own power in order to accommodate changing positions of the excavating units.

The feeder consists essentially of an endless bar type of conveyor, the bars 3 being positioned between and connecting the two endless side chains 4. These bars 3 are spaced uniformly and at suitable distances from one another to permit maximum desired passage of material therethrough. Referring to Figure 3, it will be noted that insofar as the bars themselves are concerned, material of certain size is free to pass through both the carrying and return flights of the endless conveyor directly onto the belt of the transporting conveyor unit 5 located therebelow. Thus, any lumps contained in material deposited on the feeder are retained by the bars while the fines are permitted to pass through both the upper and lower flights directly on to the belt of the conveyor below.

In order to support the bars 3 of the conveyor against undesired bending, there is positioned beneath the carrying flight and substantially midway between the ends of the bars a supporting beam 6 which is normally spaced just slightly below the normal path of travel of the bars, but which serves to support them when they are subjected to abnormal loads. This phase of construction is illustrated particularly in Figures 3 and 4. If desired, this supporting beam may be extended somewhat and curved to provide for the support of the bars at the discharge end of the feeder conveyor. However, as shown in Figures 3 and 4 this has been taken care of in a somewhat different manner, as by means of the supporting disc 7 secured midway of the sprocket shaft 8 at the discharge end of the conveyor. These discs are of such diameter as to engage the bars 3 as they travel around the sprockets. Thus, the bars are supported throughout their load carrying travel.

The feeder conveyor operates in the direction indicated by the arrow in Figures 3 and the material which does not pass between the bars of the conveyor is discharged over the left end thereof onto the belt conveyor beneath. In the absence of any provision to the contrary, this would result in the large lumps retained on the bars being discharged over the left end of the feeder conveyor onto the belt conveyor, thus resulting in uneven loading of the latter and in the imposition of severe stresses by reason of the falling of large lumps of material directly onto the belt of the conveyor. In order to avoid this and also to accomplish several other purposes, revealed in the preliminary discussion hereinabove the improved feeder embodies additional means for suitably breaking up the lumps that are normally retained on the bars. This means consists in the first instance of a series of cutters 9 attached to and forming a part of the endless bar conveyor. Referring particularly to Figure 3, it will be observed that these cutters are of right angular form, having two bifurcations, one in the end of one of the arms and the other at the juncture of the two arms. The end bifurcation engages over one of the bars 3 and the bifurcation at the juncture engages over an adjacent bar 3 and the latter, in combination with securing bolts 10, serves to hold the cutters in assembled relation on the bars and to prevent lateral movement thereof. Thus, referring to Figure 3 it will be observed that the bar conveyor presents a series of upwardly extending cutters 9 which serve in a measure to break up or split the lumps falling directly onto the cutters 9 when delivered to the conveyor and also to positively feed the material lodged thereon toward the discharge point. The arrangement of the cutters 9 may be quickly and conveniently varied to suit particular conditions as they change from time to time, that is, to handle to best advantage the class of material which is being discharged onto the feeder. As shown in Figure 1, these cutters are arranged in staggered relation in order that collectively they operate throughout the entire width of the conveyor. This arrangement, however, may be changed on short notice to meet any condition which may arise.

The cutters 9 described above are not alone sufficient to fully condition the material in the desired manner, and for this reason there is provided a cooperating set of stationary cutters. As shown in Figures 1 and 3 these consist of three inclined cutters 11 supported upon the end plate 12 of the feeder. Two of these fixed cutters 11 extend downwardly to a point overlapping the path of travel of the cutters 9 carried by the bars of the conveyor. The third or intermediate fixed cutter is somewhat shorter. By virtue of this arrangement, the lumps which are not sufficiently broken up by the cutters carried by the bars are discharged over the end of the conveyor and become lodged on the fixed cutters 11 where they are subject to repeated cutting action due to the travel of the cutters 9 carried by the bars until such time as they are sufficiently reduced in size to pass through to the belt conveyor below. When the material being treated is dry and fragile, the relatively moving blades 9 and 11 will brush or break up the lumps to reduce the size of the same, however, when the material is very wet, sticky or is what is commonly called "gumbo", the said blades will cut or slice up the lumps. It will be understood, of course, that the size, number of and arrangement of the fixed cutters 11 may also be varied to meet particular conditions and to coincide in a functional way with the particular arrangement of the cutters 9 carried by the bars.

Thus, it will be seen that the improved feeder serves to properly condition the material for the use for which it is intended, delivers the same at a desired and reasonably uniform rate to the belt conveyor by which it is to be transported to the point of use and in a condition which permits of objectionable foreign matter being picked out as the material progresses along the line of transportation. It is also to be noted that the relatively fine material which initially passes between the bars of the feeder conveyor and onto the belt conveyor below provides a cushioning layer of material upon the belt which serves to absorb and minimize the stress incident to the falling of the relatively greater volume of material which passes over the discharge end of the feeder and falls onto the belt conveyor below. In levee building work particularly, these features are of extreme importance. A relatively fine material is essential in order to avoid a levee structure having many voids such as would occur if lumpy material were used. It is also of extreme importance that decayable matter be removed from the material going into the levee, particularly organic material, in order to avoid disintegration of a completed levee structure by reason of the decay of such material. According to many conventional methods of levee construction, it is necessary to provide numerous laborers on the site of the building levee, whose work is to break up the large lumps as they are discharged thereon, and remove from such lumps all decayable material.

The improved feeder has one lateral inclined wall 13 and one end inclined side wall 14 forming a sort of a hopper for receiving material. The front end wall 12 is vertically arranged and supports the fixed cutters. The open side of the hopper is provided with a flat deck 15 just slightly above the level of the carrying flight of the conveyor and thus permits free swinging movement of the bucket of the excavator unit to and from a position immediately above the bar conveyor and without requiring undue raising and lowering of the excavator bucket. There are, of course, many features of construction not specifically described, such as the power and transmission connections for driving the bar conveyor and supplemental power connections for moving the entire feeder unit along on the rails carried by the main transporting conveyor.

Another phase of the invention which serves to substantially widen the scope of usefulness of the feeder is also illustrated in Figures 1 to 4 inclusive. This phase concerns the use of a plurality of plates 16 conveniently and adjustably associated with the bars 3 of the feeder conveyor for blanking out any desired percentage of the total spaces between the several bars. Thus, if during the course of a construction job the material being handled changes in character from a lumpy or gummy material to a sandy material, it is only necessary to attach to the bars of the conveyor an appropriate number of these plates 16 to permit the desired rate of flow of the particular material being handled through the bars 3 onto the belt conveyor below. These plates, as will be seen in Figures 3 and 4, are pivotally connected with certain of the bars and are supported by adjacent bars during the load carrying travel and depend vertically from the bars to which they are attached during the return flight. Thus, the plates effectively serve to blank out any desired portion of the spaces between the bars on the carrying run, but permit entirely unobstructed passage of material through the bars on the return flight of the conveyor. The particular arrangement of these plates shown in Figure 1 is purely arbitrary and for purposes of illustration only. The plates, as well as the cutters, may be provided in such numbers and may be so arranged as to meet variable conditions. If something of this character were not used, it will be readily appreciated that fine or sandy material, when discharged onto the feeder, would all pass directly between the bars and onto the belt conveyor below, thus resulting in uneven and overloading of the conveyor and in practically intermittent delivery of excessive quantities of material at the point of use.

Figures 5 and 6 illustrate a modification in certain respects of the invention herein above described. According to this form, the fixed cutters at the discharge end of the feeder conveyor are replaced by rotary cutters 17, preferably, though not necessarily power operated, which cooperate in a manner similar to the fixed cutters with the movable cutters 9 carried by the bar conveyor. This rotary cutter may, for example, consist of a suitable power operated shaft 18 having arranged thereon a series of cutter elements which, according to the arrangement shown, operate in planes disposed between the paths of travel of the respective series of cutters 9 carried by the bar conveyor. Other arrangements of course, may be resorted to, but the one shown adequately carries out the purpose. Thus, lumpy material deposited on the feeder conveyor is carried to the discharge end thereof, where it encounters the rotary cutter, which, together with the cutters carried by the bar conveyor necessitate reduction of the material to proper size before it can be passed on to the belt conveyor below. It might be stated, however, that the fixed cutters 11 are in general more satisfactory than the rotary cutter 17 shown in Figures 5 and 6, and, of course, of much simpler construction, not involving additional power driving connections.

Thus, the need for an intermediate unit for the handling and preparation of material delivered by an excavating unit and to be discharged upon a transporting unit has been completely met by the apparatus of the present invention. Feeder units in general are quite well known and have been used in situations similar to those here under consideration, but there has not been provided heretofore a combined feeding and material conditioning apparatus for this purpose, nor has there been developed heretofore any apparatus having the adaptability and flexibility of operations to meet changing conditions such as may be met with the apparatus herein described. There are, no doubt, many industrial operations involving situations for which the present feeder will provide an excellent solution, but perhaps as important as any is the application to levee construction work, in which field the particular feeder herein described has established its merit. Thus, the continuous method of transporting material to and discharging same into a levee was not completely satisfactory until a feeder unit of the character herein set forth was interposed between the excavating units and the continuous conveyor system. The result of this combination, however, has been an outstandingly efficient levee building method.

The exact structures described herein were selected primarily for purposes of illustration and it should be recognized that many variations may be made in structure without department from the principles involved or sacrificing any of the advantages of these principles.

We claim:

1. A unit adapted for handling and preparing earthy material comprising an endless conveyor consisting of a plurality of spaced bars, a plurality of cutters carried by said bars and arranged in such staggered relation as to define several distinct paths of travel, in combination with a plurality of fixed cutters associated with the frame of said unit at the discharge end thereof positioned intermediate the respective paths of travel of the aforesaid cutters and in overlapping relation thereto.

2. A material handling and preparation unit comprising an endless conveyor consisting of a plurality of spaced screening bars in combination with means extending between some of the adjacent bars for blanking out portions of the spaces therebetween, thus determining the rate of flow of material through the upper flight of said conveyor, and means for detachably connecting said blanking out means to desired bars without disturbing the assembly of the conveyor.

3. A material handling and preparation unit comprising an endless conveyor consisting of a plurality of spaced bars, a plurality of cutters carried by said bars for breaking up the larger portions of material discharged thereon, and a plurality of elements associated with said bars for blanking out desired portions of the spaces therebetween for determining the rate of flow of the material therethrough.

4. A material preparation and handling unit comprising an endless conveyor consisting of a plurality of spaced bars, a plurality of cutter elements carried by and movable with said bars, a plurality of fixed cutter elements positioned adjacent to discharge end of said conveyor and cooperating with said movable cutter elements for disintegrating lump material, and a plurality of plates associated with said bars for blanking out desired portions of the spaces therebetween for determining the rate of flow of fine material therethrough.

5. The combination with a transporting belt conveyor unit, of a material handling unit adapted to receive material from an excavating unit, or the like, to prepare the material for the conveyor unit, said handling unit comprising means to separate the fines from the lumps by directly discharging the fines onto the conveyor unit, means carried by the first mentioned means for permitting variation of the rate of feed of the fines through said first means to the conveyor unit, and means for disintegrating the separated lumps and discharging the disintegrated material onto the conveyor unit, said disintegrating means comprising elements movable with and carried by the separating means and fixed cooperating elements, whereby the entire material will be fed to the conveyor unit at a substantially predetermined and relatively uniform rate and in a reasonably uniform condition to permit decayable material to be removed from the material while on the conveyor unit.

6. A material handling and preparation unit comprising an endless screening conveyor adapted to separate lumps of predetermined size from the fines by passing the fines through the conveyor, means operatively associated with the conveyor for blanking out selected areas of the same to control the rate of flow of the fines therethrough, and means operating at the discharge end of the conveyor for disintegrating the separated lumps before discharging the same.

7. A unit substantially as set forth in claim 6 further characterized in that the blanking out means comprises plates adapted to lie flatly on the surface of the conveyor on the upper run and to depend vertically on the lower run.

8. A unit substantially as set forth in claim 6 further characterized in that the disintegrating means consists of relatively movable material slicing blades.

9. Apparatus of the type described comprising a belt conveyor unit, and a material handling and preparation unit supported on the conveyor unit to move lengthwise of the latter, said material handling unit including means for separating the fines from the oversize by directly passing the fines to the conveyor unit, and means cooperating with the first-mentioned means for breaking up the oversize before delivery to the conveyor unit.

10. Apparatus of the type described comprising a conveyor unit, and a material handling and preparation unit supported to overlie the belt of the conveyor unit, said material handling unit comprising an endless screening conveyor adapted to pass fines through to the belt conveyor for substantially uniform distribution thereon and to carry the oversize to the discharge end of the screening conveyor, and means cooperating with the screening conveyor for breaking up the oversize and discharging the same onto the previously distributed fines which serve to cushion the fall of the broken up oversize.

11. A material handling and preparation unit adapted to have material deposited thereupon by an excavator or the like, comprising an endless bar conveyor, a plurality of upwardly extending cutting blades carried by said bars to break up lump material falling thereon and to assist the bars of the conveyor to feed material to the point of discharge, and means positioned at the point of discharge of the conveyor for cooperating with the cutting blades to break up the lump material fed to said discharge.

12. In combination, a transporting belt conveyor, and a material handling unit adapted to be supported above said belt conveyor, said unit comprising an endless conveyor driven in the same direction as the belt conveyor and consisting of a plurality of transversely arranged, longitudinally spaced bars adapted to directly support lump material of a size which will not pass between said bars for conveying the same to the discharge end of the unit and to permit all or a substantial portion of the fines to pass directly through onto the said belt conveyor to form a layer of material thereon which serves to cushion the balance of the material discharged from the end of said unit.

13. A material handling and preparation unit comprising an endless conveyor made up of a plurality of spaced screening bars in combination with means for blanking out any desired portions of the spaces between said bars, said means comprising plates pivotally associated with and adapted to lie flatly upon certain of said bars during their load carrying travel.

14. A unit substantially as set forth in claim 13 further characterized in that the said plates depend vertically from the bars on the lower flight of the conveyor, thus leaving the spaces between said bars on said lower flight unobstructed.

15. In combination, a belt conveyor unit, and a material preparing unit positioned to feed the material handled thereby to the belt of said first unit, said material preparing unit comprising means for separating fines from lump material, means for controlling the rate of feed of fines to the belt conveyor, and means for breaking up lump material before feeding it to the belt conveyor.

16. A unit adapted for handling and conditioning earthy material deposited thereon by an excavator, or the like, comprising a frame, an endless bar conveyor, and cooperating cutting elements carried by the frame adjacent the discharge end of the conveyor and by the conveyor bars for slicing up such portions of the earthy material as are carried to the discharge end of the conveyor.

17. A unit substantially as set forth in claim 16 further characterized in that said cutting elements which are carried by said conveyor comprise upstanding blades adapted to split up large lumps of earthy material when they fall thereupon.

18. A unit adapted for conditioning earthy material comprising a frame, an endless bar conveyor carried by the frame, a plurality of fixed cutter blades carried by the frame beyond the discharge end of the conveyor, a plurality of cutter blades carried by the conveyor, and means for adjustably connecting the last mentioned cutter blades to the bars of the conveyor so that they will be arranged in staggered relation with respect to each other for cooperating with the fixed cutter blades for cutting up the lumps of material which do not pass between the bars of the conveyor.

19. A unit adapted for conditioning earthy material deposited thereupon by an excavator, or the like, comprising an endless conveyor having transverse screening bars, and a plurality of cutter blades adjustably mounted on the bars of and extending substantially at right angles to the conveyor for splitting up lumps of said material which drop directly thereupon.

20. A device of the type described comprising a transporting conveyor, a material feeding and sizing unit, and means for supporting said unit for bodily movement longitudinally of said conveyor, said unit comprising an endless screening bar conveyor having the bars spaced to permit material up to a predetermined size to pass directly therebetween onto said transporting conveyor and to carry the oversize to the discharge end of the bar conveyor, and means operating at the discharge end of the bar conveyor for breaking up the oversize and discharging the broken up pieces onto the transporting conveyor.

21. A unit adapted for handling and preparing earthy material comprising a frame, an endless bar conveyor carried by the frame, a plurality of cutter blades carried by the bars of said conveyor to project perpendicularly therefrom and arranged in such staggered relation relative to each other as to define several distinct paths of travel, in combination with a plurality of fixed, inclined cutter blades carried by the frame adjacent the discharge end of the conveyor and positioned intermediate the respective paths of travel of the first-mentioned cutter blades and in overlapping relation thereto.

22. A unit substantially as set forth in claim 21 further characterized in that each of said first-mentioned cutter blades is provided with means for detachably and laterally adjustably connecting it to two bars of the conveyor.

23. In combination, a transporting conveyor unit, a material preparing unit positioned to feed the material handled thereby to the said first unit, and means for supporting the material preparing unit for bodily movement lengthwise of the transporting conveyor unit, said material preparing unit comprising screening means having a width which is substantially no greater than that of the transporting conveyor for separating fines from lump material by directly feeding the fines to the transporting conveyor, and means forming a part of the screening means and positioned above the transporting conveyor for breaking up lump material before feeding it to said transporting unit.

24. A material handling and preparation unit comprising an endless screening bar conveyor adapted to permit material up to a predetermined maximum size to pass directly therethrough and to transport the oversize to the discharge end of the conveyor, fixed cutter blades arranged adjacent the discharge end of the conveyor and cooperating with the latter for receiving and holding the oversize between said fixed cutter blades and conveyor end, and cutter blades variably positioned on the different bars of the conveyor to move therewith for cooperating with the first mentioned blades upon arrival at the discharge end of the conveyor to break up the oversize to such a size that the said first mentioned means will no longer hold the same.

25. A unit adapted for handling and conditioning earthy material comprising in combination with a transporting conveyor of an endless bar conveyor positioned above and extend longitudinally of the transporting conveyor, the bar conveyor being of substantially no greater width than the width of the transporting conveyor and having its bars arranged to separate fines from lumps by permitting the fines to fall between the bars directly onto the transporting conveyor, means located at the discharge end of the bar conveyor above the transporting conveyor, and means carried by the bars of the bar conveyor and cooperating with the aforementioned means for slicing up the larger lumps of earthy material before discharging same onto said transporting conveyor.

WILLIAM E. PHILIPS.
WILLIAM W. SAYERS.